United States Patent [19]
de Kermadec et al.

[11] 4,427,988
[45] Jan. 24, 1984

[54] IMAGE PRINT HEAD

[75] Inventors: Alain de Kermadec, Rochefort en Yvelines; Christian Delanoe, Versailles; Gerard Normand, Montferrand le Chateau, all of France

[73] Assignee: Societe Anonyme dite Compagnie Industrielle des Telecommunications CIT-Alcatel, Paris, France

[21] Appl. No.: 356,018

[22] Filed: Mar. 8, 1982

[30] Foreign Application Priority Data

Mar. 6, 1981 [FR] France ............................. 81 04482

[51] Int. Cl.$^3$ ............................................ G01D 15/06
[52] U.S. Cl. .................................................... 346/155
[58] Field of Search ............................ 346/139 C, 155

[56] References Cited

U.S. PATENT DOCUMENTS

3,718,936  2/1973  Rice, Jr. ............................. 346/155

Primary Examiner—Thomas H. Tarcza
Attorney, Agent, or Firm—Sughrue, Mion, Zinn, Macpeak, and Seas

[57] ABSTRACT

A multiple stylus print head, e.g. for printing a document in a facsimile system, has at least two parallel lines of styluses with the styluses being offset from one line to the next. Each line of styluses is built up from several tiers of interdigitated conductor pins (C) having tips that constitute the styluses per se. The tiers of pins are held together by respective strips of insulating material (7) forming comb-like structures which are then stacked together in such a manner that the combs fan out from the line of styluses. A plurality of groups ($G_1$, $G_2$) of stylus line forming comb structures are stacked together into a single stack.

11 Claims, 13 Drawing Figures

IMAGE PRINT HEAD

The present invention relates to an image print head, and in particular to a print head for printing the image of a document in facsimile apparatus.

BACKGROUND OF THE INVENTION

In facsimile apparatus, document reproduction is generally performed by a print head that scans an image supporting medium in successive scan lines. The medium is often some kind of sensitive paper. The print head is excited by data representative of points detected along line of a document to be reproduced. An image of the document is produced on the medium by causing corresponding points to appear thereon by means of whatever printing method is employed by the apparatus.

Some printing methods require a sensitive medium whose appearance can be changed locally, e.g. by changing its color. Such media include electrochemical, electrothermal and heat sensitive papers. An image of the document to be reproduced is then formed by changing the appearance of those points on the sensitive medium which are determined by the data representative of image points on the original document. Thus, when using an electrochemical or an electrothermal paper, local appearance is modified by applying an electrically conductive stylus to the paper and passing a current between the stylus and the paper. The passage of electricity through the paper changes its color, either by inducing a chemical reaction or by resistive heating, depending on whether the paper is electrochemical or electrothermal. When using heat sensitive paper, the stylus includes a resistive element through which the electric current is passed, thereby heating the stylus. A local change of color is produced on the heat sensitive paper by a physical or chemical reaction which is induced by the hot stylus being pressed thereagainst, or being brought very close thereto.

Another printing method is the electrostatic method which makes use of an image supporting medium comprising an electrically conductive substrate covered with a thin dielectric layer. In this method, a latent image of the document to be reproduced is formed on the medium by placing electric charges at points on the medium that are defined by the data representing the document to be reproduced. Localised charges can be placed on the medium by applying both an electrode and a counter-electrode against the medium, and then setting up a potential difference of several hundreds of volts between the electrode and the counter electrode. The electrode is constituted by the stylus and it is pointed, while the counter electrode is larger and flat. The electrode and counter-electrode may both be disposed on the same side of the medium, in which case they are disposed on the dielectric side, or else they may be on opposite sides, in which case the electrode is on the dielectric side and the counter-electrode is on the conductive side. The potential difference ionizes air in the neighborhood of the pointed electrode, and since the counter-electrode is larger and flat, electric charge accumulates locally on the dielectric layer in the vicinity of the electrode. The latent image thus formed is then developed and fixed, either on the original medium (e.g. a dielectric paper) or on another medium (e.g. ordinary paper) after transfer thereto. Diverse techniques are used for doing this, but they are not described further here since they have no direct bearing on the invention.

Some print heads have as many styluses as there are image points along a scan line. The styluses may be aligned in a single line, in which case they are spaced at the point definition pitch along the scan line, or else they may be disposed in two parallel lines, in which case they are spaced at twice the point deflection pitch along the scan line, with the styluses of one line being placed opposite the gaps in the other. The lines of styluses may be separated by an isolation line whose width is equal to the width of one scan line. Regardless of the number of lines of styluses, an image is printed by relative movement of the medium and the print head in a direction perpendicular to the lines of styluses.

Since the image definition path along a scan line is generally very small (125 $\mu$m for group III facsimile apparatus), industrial production of such prior multi-stylus print heads calls for highly specialised tooling.

Preferred embodiments of the present invention provide a multi-stylus print head that can be manufactured using more conventional tooling.

SUMMARY OF THE INVENTION

The present invention provides a print head comprising a plurality of styluses which are regularly spaced out along at least two parallel lines, with the styluses being off-set relative to one another from one line to the next, said styluses being formed by the tips of respective electrical conductor pins which are rectilinear at least over a portion of their length which is near to said stylus-forming tips, wherein said pins are mounted in a plurality of tiers with the tips of the pins in each tier being alinged and regularly spaced, and at least said rectilinear portions of the pins lying parallel to one another, wherein each line comprises interdigitated stylus tips from a group of n tiers of pins, where n is an integer greater than 1, with every n-th tip in the line belonging to the same tier, and with the parallel portions of said tiers occupying respective planes that fan out from said line, and wherein the different groups of tiers of pins whose tips constitute the different lines of styluses are stacked into a single assembly.

In a preferred embodiment, the print head comprises eight tiers of conductor pins arranged in two groups of four tiers each, with the stylus-forming tips of the two groups being aligned in two respective parallel lines, and with the styluses of each line being opposite the gaps in the other.

It is also preferable for the styluses of each tier to be mechanically held in place relative to one another by a support member for that tier made of insulating material.

BRIEF DESCRIPTION OF THE DRAWINGS

An embodiment of the invention is described by way of example with reference to the accompanying drawings in which.

MORE DETAILED DESCRIPTION

The print head shown in the drawings is intended to produce a latent electrostatic image on a medium such as dielectric paper. The head scans the paper in successive scan lines and has as many styluses as there are image points along a scan line. By way of example, a typical scan line has 1728 points regularly spaced out over 216 mm, giving an image point definition along a scan line of 125 $\mu$m. A scan line is considered as being 130 $\mu$m wide. The print head thus has 1728 styluses for printing image points, and each of them occupies an area of substantially 125 $\mu$m $\times$ 130 $\mu$m.

Figure 1:
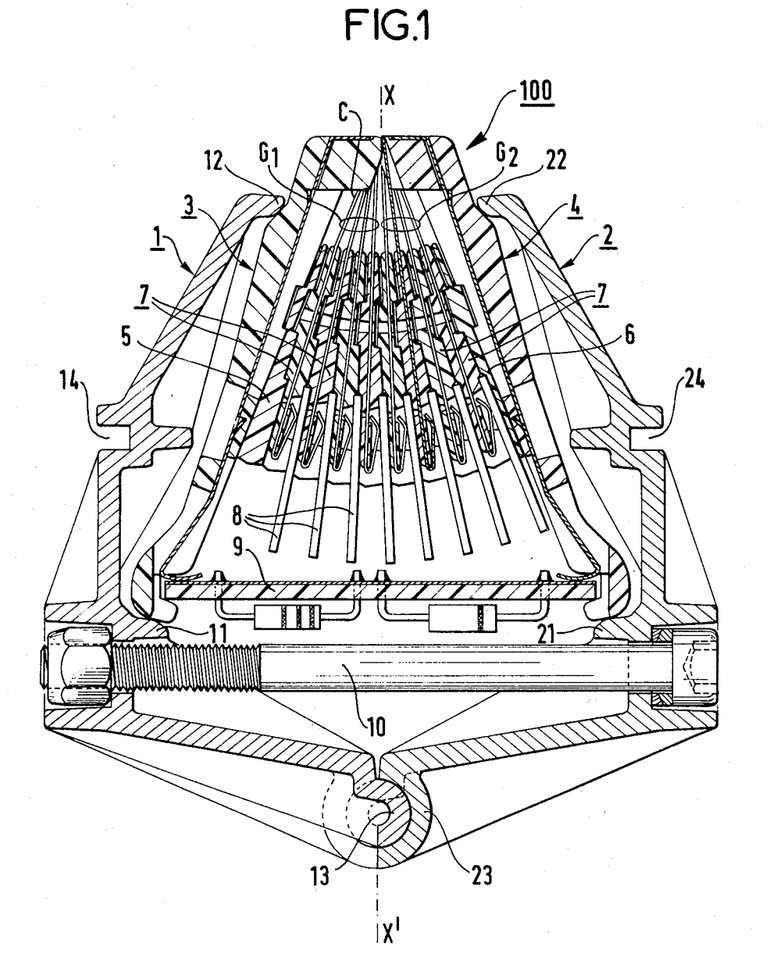
FIG. 1 is a cross section through a print head in accordance with the invention.

In FIG. 1, a print head 100 comprises two longitudinally extending housing shells 1 and 2 having cooperating pairs of inwardly directed and longitudinally extending bearing surfaces 11, 21 and 12, 22. When the shells are assembled, the bearing surfaces compress a stack of generally elongate strip members housed substantially inside the housing shells. The outermost members of the stack in direct contact with the bearing surfaces are two strips 3 and 4 of auxiliary conductors; they press against two stack wedging members 5 and 6 respectively which in turn press against eight combs 7 of conductor pins, each associated with a respective printed circuit card 8, in a manner described below.

These members 3 to 8 inside the housing shells constitute a stack of members fanning out inside the shells, i.e. the stack is of substantially trapezoidal cross section between said pairs bearing surfaces 11, 21 and 12, 22. The thin edge of the stack projects beyond the housing shells and constitutes the top of the print head. The thick edge of the stack is covered by a further printed circuit card 9 which extends between the two strips 3 and 4 of auxiliary conductors, and is associated therewith, as is explained below.

The housing shells 1 and 2 have lower edge portions 13 and 23 respectively which project beyond the printed circuit card 9 where they mate. Advantageously the lower edge portions have alternating male and female mating parts distributed along the length of the print head, and further they constitute a form of hinge about which the housing shells are free to rotate relative to each other.

When assembled, the housing shells are held together by bolts such as 10 which are evenly spaced out along the length of the print head 100, and which pass through the shells at the widest point of the housing in between the mating lower edges 13 and 23 and the bearing surfaces 11 and 21.

Figure 11:
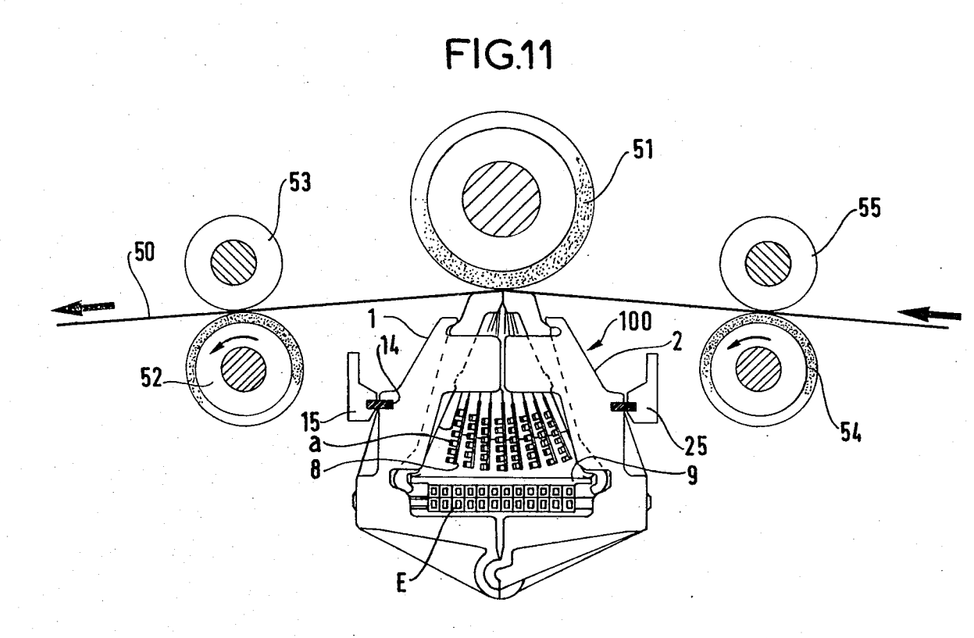
FIG. 11 is an end view of the print head seen from the end where its electrical connections are made.

On their outside surfaces, the shells are provided with head guide slots 14 and 24 which engage outside guide supports 15 and 25 (see FIG. 11).

Figure 2:
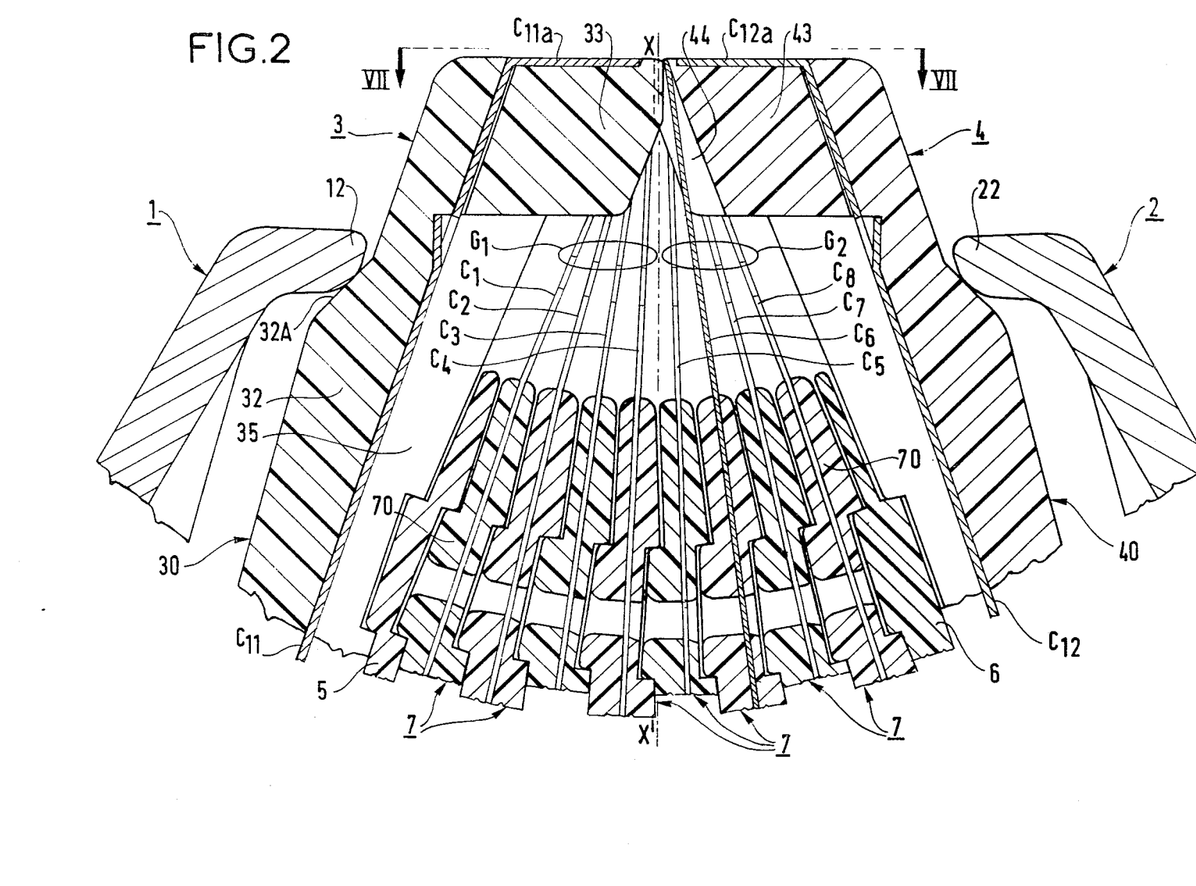
FIG. 2 shows the upper portion of FIG. 1 on a larger scale.

With reference to FIGS. 1 and 2, the print head has eight longitudinally extending tiers of electrical conductor pins arranged in eight combs 7. In FIG. 1 the pins are generally referenced C, while in FIG. 2 the pins of the different tiers are distinguished by respective references $C_1$ to $C_8$. In either figure only one conductor of each tier is visible, since the tiers are seen end on.

The eight tiers of conductor pins $C_1$ to $C_8$ are arranged in two groups $G_2$ and $G_2$ of four tiers each. The tiers of conductor pins $C_1$ to $C_4$ constitute the group $G_1$, while the tiers of pins $C_5$ to $C_8$ constitute the group $G_2$. The tips of the conductor pins constitute the styluses of the print head, and the tips of the pins of each group $G_1$ or $G_2$ are aligned in respective lines extending perpendicularly to the plane of FIGS. 1 and 2. The tips are regularly spaced along the lines to which they belong ane every 4-th tip along each line belongs to the same comb. The combs of each group thus fan out from the line of their tips with an angle of about 6° to 7° between adjacent combs. The three angles formed between the four combs of a group are similar, but need not be identical.

The tips of the pins $C_1$ to $C_8$ constituting respective styluses of the print head are thus disposed along two parallel lines from which the tiers fan out in two respective groups, spreading out from said two lines in two groups of four planes diverging in two groups of three interplane angles. The two groups of planes are symmetrically arranged on either side of the mid plane XX' through the print head, and the angle between the plane of each group closest to the mid plane, and the corresponding plane in the other group is slightly less than the angles between the planes of each group.

The stylus forming tips are spaced out along each line at twice the point definition along a scan line, i.e. at 250 $\mu$m in the present case, and since there are four tiers of conductor pins in each group the pins of any one tier are at one fourth that spacing, i.e. at 1 mm intervals, which is one eighth the point definition pitch.

The two lines of styluses thus constituted are at double scan line spacing, i.e. they are separated by an isolation line whose width is equal to that of one scan line. The styluses of each line are placed opposite the gaps between the styluses of the other line.

In each tier of conductor pins, the pins are made of flexible metal wire and are disposed in parallel at a regular pitch of one pin every 1 mm along the tier. Apart from a slight bend in the middle of the pins in some of the tiers as explained below, and apart from the hook-shaped contact-forming second end of each pin opposite to its stylus tip, each of the conductor pins $C_1$ to $C_8$ lies at substantially the same angle to the mid plane XX' over its entire length.

The tips of the conductor pins $C_1$ to $C_8$ in their two lines are constituted by the end surfaces of the conductor pins which are chamfered. Since the pins are all of identical cross section, and since they are subtended from the line at different angles, the exact dimensions of the chamfered tips are different from one tier to the next within each group. Although the tip dimensions determine the size of the spots written on the paper as it passes over the tip, the variations in spot size are negligible for tiers at small angles to each other such as those already described.

It would be possible in a variant to curve the conductor pins over a short portion of their length at their stylus tip ends to make them parallel to the mid plane XX'. This would ensure that all the tips were of the same size, meeting the paper at right angles with a right cross section of the pins.

Each tier of conductor pins in the example being described comprises 216 conductor pins, and the pins of the same tier are held together by a tier support member made of insulating material. The tier support members are identical from one tier to the next, and they are hence all referenced 70 regardless of the tier to which they belong. The assembly comprising a tier of conductor pins held together by a tier support member is referred to as a comb, and the combs are referenced 7 regardless of the tier to which they belong. In each comb 7, the tier support member 70 forms an elongate strip in which the conductor pins are partially embedded, with a first longitudinal edge of the tier support member having the stylus forming tips of the conductor pins projecting therefrom, and with the opposite or second longitudinal edge of the support member having the opposite ends of the pins projecting therefrom and extending back over the support member to form connection terminals.

Each support member has two longitudinally extending side faces of respective complementary shapes that are identical from one comb to the next. Thus the set of combs 7 are stacked with each side face of a support member engaging a complementary side face of an adjacent member, except for the end combs in the stack of combs whose outwardly directed side faces engage complementary faces on the stack wedging members 5 and 6 respectively. The indeces 1 to 8 have been used for the conductor pins $C_1$ and $C_8$ in the eight tiers respectively in increasing order counting from the wedging member 5 to the wedging member 6. Thus the tier support member for the pins $C_1$ engages the wedging member 5, while the tier support member for the pins $C_8$ engages the wedging member 6.

It will be observed, that in the assembled stack of combs already described, it is mainly the shape of the support members 70 that determines the angles between adjacent combs. Additionally, the tiers of conductors pins $C_1$, $C_2$, $C_3$, $C_6$, $C_7$ and $C_8$ include respective slight bends along the first longitudinal edge of their support members, with tiers $C_1$ and $C_8$ being more bent that tiers $C_2$ and $C_7$, which in turn are more bent than tiers $C_3$ and $C_6$. The bends serve to group the stylus forming tips in two lines, rather than having them all occupy a single line which is what would otherwise happen, since the tier support members 70 are all identical. These slight bends can be given to the tiers of conductor pins during assembly of the print head, but they could be avoided all together in a variant either by using thicker tier support members for the middle two tiers $C_4$ and $C_5$, or else by including a middle wedging member in between said middle two tiers.

Proper longitudinal relative spacing between the tiers is provided by means that are described below.

In FIGS. 1 and 2, the conductor pins $C_1$ to $C_8$ are drawn as though the plane of the figure intersects each of the tier support members through a conductor pin. This is to show up the conductor pins better, but in fact, is not strictly representative since the combs are longitudinally displaced relatively to each other.

Each tier of conductor pins $C_1$ to $C_8$, i.e. each comb 7, is associated with a corresponding printed circuit card, all eight of which are referenced 8.

Each card 8 is of substantially the same length as the combs 7 and bears a circuit for making connection to the conductor pins of the associated combs, to supply them with electricity. The cards connect the pins to a print head input constituted by a connector (not shown in FIGS. 1 and 2) disposed at the end of the card at a first end of the print head. Each card comprises as many connection pads as there are pins to a tier; the pads are arranged along one side of an edge of the card at the pin spacing (1 mm in this case) and adjacent the connection terminals of the conductor pins. The pads are connected together in sets following a circuit diagram that is described below and are then connected via a smaller number of tracks than there are pins to said print head input connector. The tracks are disposed on the opposite side of the card to the connection pads, and they are connected thereto by plated through holes in conventional manner. At their other ends they are soldered to the connector, likewise in conventional manner. The connection pad bearing edge of each card is slotted in between said second edges of two adjacent tier support members, or else between the stack wedging member 6 and the second edge of the end tier support member of the stack. The tier support members are suitably shaped to receive the cards 8 with the connection pads facing the comb with which the card is associated. Contact between each connection pad and the connection terminal on the corresponding conductor pin is ensured by simple pressure provided by the resilience of a suitably shaped second end of the conductor pin.

Two further longitudinally extending tiers of electrical conductors $C_{11}$ and $C_{12}$ are associated with the two groups $G_1$ and $G_2$ of tiers of conductor pins $C_1$ to $C_8$. These further conductors $C_{11}$ and $C_{12}$ are auxiliary conductors, and are held together in auxiliary conductor strips 3 and 4. Only one auxiliary conductor is visible in each of the tiers of auxiliary conductors as shown in FIGS. 1 and 2. The auxiliary conductor support strips 3 and 4 extend along the length of the print head on either side of the stack of combs 7 outside the stack wedging members 5 and 6 respectively.

First ends $C_{11a}$ and $C_{12a}$ of the auxiliary conductors $C_{11}$ and $C_{12}$ are aligned along two respective lines level with the stylus forming tips of the conductor pins $C_1$ to $C_8$. The first end of each auxiliary conductor comprises a flat end portion disposed around adjacent stylus forming tips, in a plane substantially perpendicular to the mid plane XX'. One face of said flat portion is outwardly directed and lies in the same plane as the chamfered stylus forming tips. This face comes into contact with the dielectric paper when the apparatus is in operation. The first ends of the auxiliary conductors constitute so-called counter-electrodes for electrostatic printing, with the stylus tips constituting so-called electrodes. The auxiliary conductors are regularly spaced along their respective lines at a pitch of 3 mm in the example under consideration. Thus the paper contacting face of a counter-electrode is substantially 2.5 mm×4 mm, and there are 73 auxiliary conductors in each tier.

The two lines of counter-electrodes are very close to their associated lines of styluses, with the counter-electrodes being about 200 $\mu$m from the corresponding electrodes, and with the counter-electrodes along each line being disposed opposite a counter-electrode of the other line.

The two tiers of auxiliary conductors are symmetrically disposed about the mid plane XX', with the auxiliary conductors in each tier being parallel to one another. The extend at an angle of about 110° at their first ends, and their opposite, or seconds ends which are situated lower down inside the head than the second ends of the conductor pins, are hook shaped to form connection terminals.

The two tiers of auxiliary supports are supported mechanically by respective identical insulating support members 30 and 40, in which the auxiliary conductors are embedded. The assembled auxiliary conductors in their support members constituting the auxiliary conductor strips 3 and 4 which are stacked round the stack of combs 7 via the stack wedging members 5 and 6 which fit into the auxiliary conductor support members 30 and 40.

Figure 7:
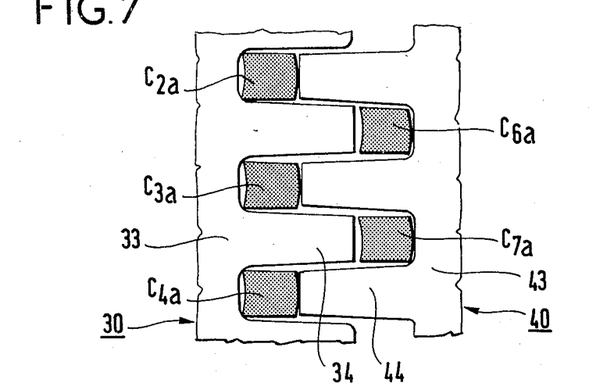
FIG. 7 is a partial plan view of the upper portion of a print head, on a greatly enlarged scale and looking in the direction of an arrow VII in FIG. 2.
Figure 8:
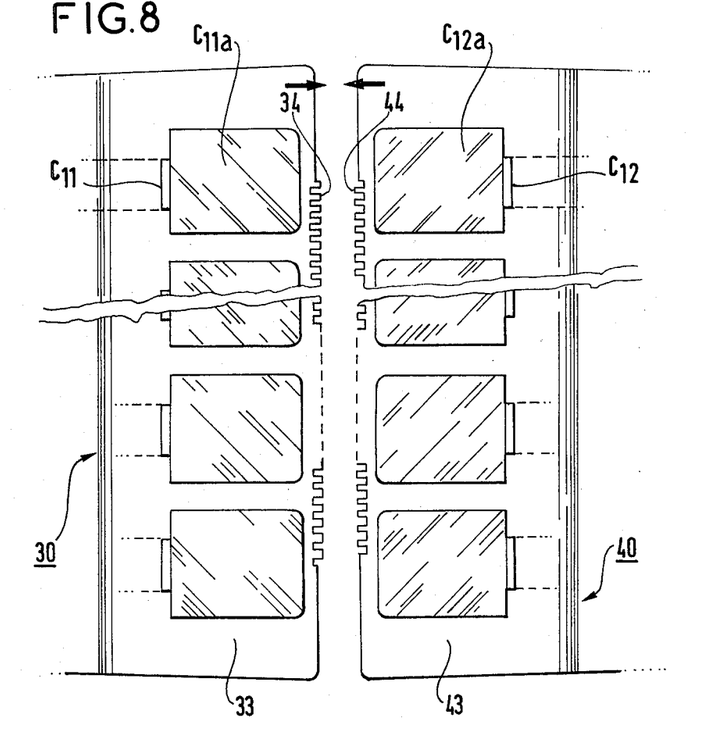
FIG. 8 is a partial plan view of the print head of FIGS. 1 and 2 on a larger scale.

To obtain correct relative longitudinal positions for the tiers of conductor pins $C_1$ to $C_8$ and the tiers of auxiliary conductors $C_{11}$ and $C_{12}$, and also to obtain the required spacing between the lines of styluses and the lines of counter-electrodes, the identical support members 30 and 40 have rims that are uppermost in the assembled print head with each rim having a longitudinally extending row of teeth 44 that meshes with the teeth of the other rim, see FIGS. 7 and 8. The auxiliary conductors are flush with the uppermost surface of the rims, while the teeth are disposed along the inwardly directed edges of the rims. The teeth are slightly less wide than the styluses, i.e. slightly less than 125 $\mu$m across, and they are disposed at a regular pitch matching that of the styluses along each line of styluses, i.e. 250 $\mu$m. The teeth do not interpenetrate fully, leaving room between the teeth of the support 30 to receive the stylus forming tips of the conductor pins $C_1$ to $C_4$, and between the teeth of the support 40 to receive the stylus forming tips of the conductor pins $C_5$ to $C_8$. The bottom of the gap between adjacent teeth is in loose contact with one side of the stylus forming tips and is suitably sloped relative to the mid plane XX' to allow for the angle at which the conductor pins arrive at the top of the print head. The other side of each stylus forming tip is in contact with the crown of a tooth from the other row of teeth at a point slightly below the top of the print head. Advantageously, because of the angles between the different tiers of conductor pins, the upper sides of the teeth slope down slightly towards the sides of the styluses that are to come into contact with the paper. It will be observed that the two rows of teeth ensure proper electrical insulation between the conductor pins $C_1$ to $C_8$ at the top of the print head, i.e. in the region where the conductor pins are closest together.

The printed circuit card 9 is slotted in between the auxiliary tier support members 30 and 40 near their lower edges. The support members 30 and 40 have respective slots running along their lower inwardly directed margins in which the longitudinal edges of the card 9 are received. The said second ends of the auxiliary conductors project downwardly into said slots and press down resiliently on the card 9 urging it against the lower walls of said slots.

The card 9 and the auxiliary conductor strips 3 and 4 thus constitute a kind of box section member of generally trapezoidal cross section with the large base of the trapezium being the card 9 and the small base being the interfitting rims of the support members 30 and 40. The eight combs 7 of conductor pins together with their eight associated cards 8 fan out inside the box section member in between the wedging members 5 and 6.

The printed circuit card 9 has an addressing circuit for addressing the auxiliary conductors $C_{11}$ and $C_{12}$, i.e. the counter-electrodes. The inputs to the addressing circuit (not shown in the figures) are brought out to a connector (not shown) which is soldered the end of the card situated at the said first end of the print head at which the inputs to the cards 8 are located. There are as many outputs (not shown) from the addressing circuit as there are auxiliary conductors. These outputs extend over the face of the card facing towards the styluses and terminate along the edges thereof at 3 mm intervals where they come into contact with the said second ends of terminals of the auxiliary conductors. Electrical contact is maintained by the resilient pressure applied by the hooked shape of said second ends. The circuit diagram of the addressing circuit is described below: it includes components such as diodes and resistors. These components are represented by two unreferenced examples shown in FIG. 1. Advantageously they are all mounted on the opposite face of the card 9 to the face over which the addressing outputs extend.

Figure 3:
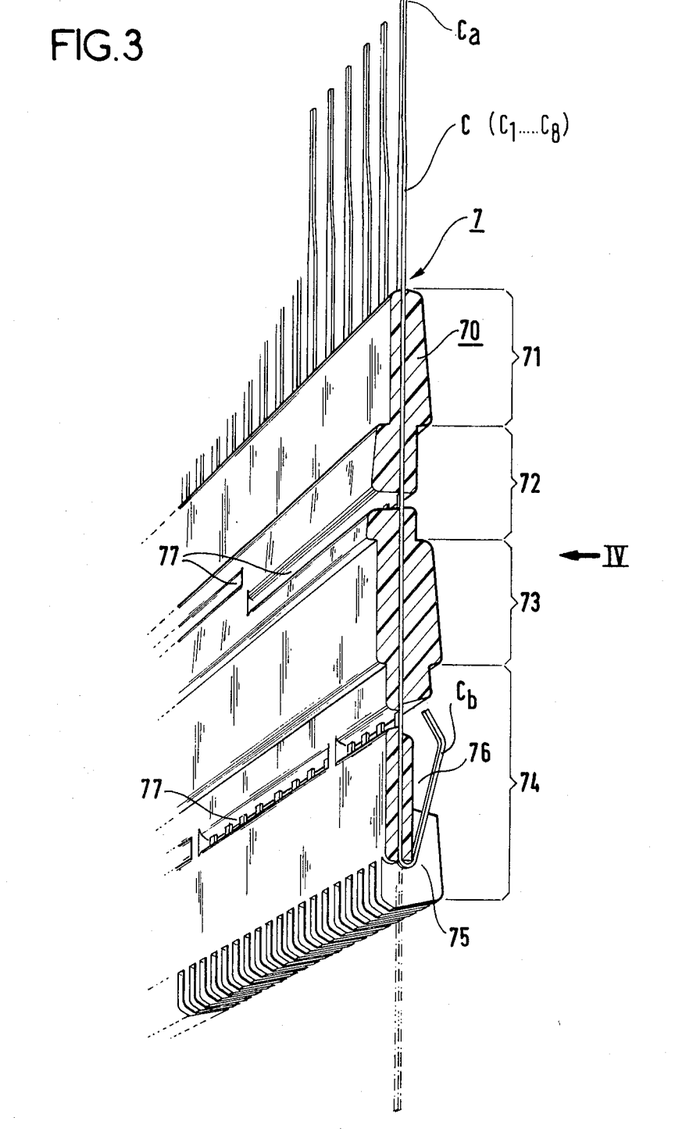
FIG. 3 is a partial perspective view and cross section of a comb of conductor pins used in the print head.
Figure 4:
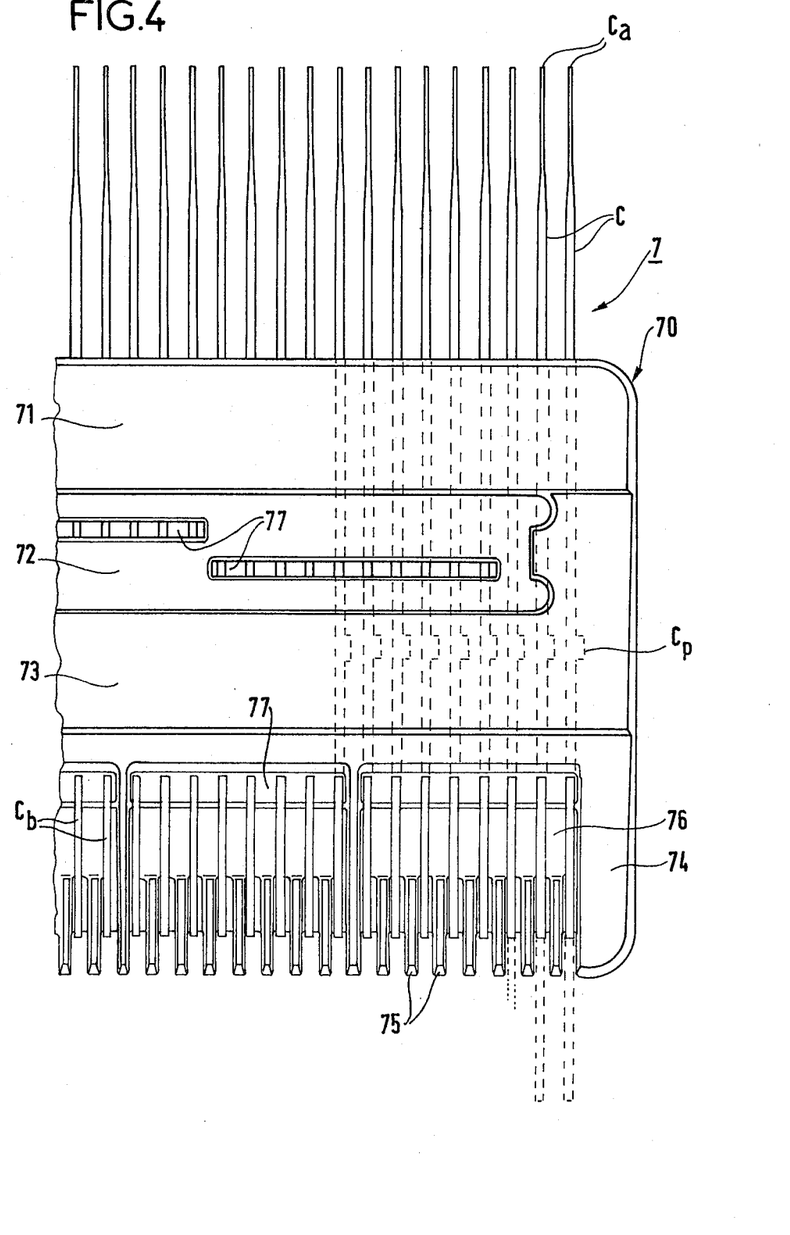
FIG. 4 is a partial elevation of a comb seen looking along an arrow IV in FIG. 3.

Additional details of the print head as described with reference to FIGS. 1 and 2, appear from FIGS. 3 and 4 which illustrate one of the combs 7 constituted by a tier of conductor pins $C_1$, or $C_2$, ... or $C_8$, and simply designated by the letter C, embedded in their support member 70. In FIGS. 3 and 4 the comb is shown in isolation, i.e. before being assembled in a print head. The various steps required in the manufacture of such a comb are not specifically drawn since they can be readily understood from the following description.

The comb may be obtaned by moulding plastics material over a grid cut or stamped out from a metal sheet whose thickness is slightly less than the width of a scan line. The bars of the grid are spaced out regularly at eight times the image point definition pitch along an image line, i.e. at 1 mm intervals in the present case. The bars may be about 300 $\mu$m wide, and constitute the conductor pins C whose first ends will constitute the styluses. During the moulding operation both ends of the bars remain joined to respective longitudinal side members of the grid. After moulding, the bars are separated from each other by cutting off the longitudinal side members, after which the first and second ends of the bars can be suitably shaped to obtain a comb 7 as shown in the figures.

The cross section of the support member 70, and the shaping steps for the ends of the conductor pins C are described with reference to FIGS. 3 and 4.

The first ends $C_a$ of the conductor pins are simply recified to the width desired for the styluses, i.e. 125 $\mu$m. The second ends of the conductors are folded over the same side of the support 70 and curved suitably to form spring blade type contacts designated $C_b$.

To describe the cross section of the support 70, the cross section is divided into four regions disposed side by side across the width of the the support 70. These regions are referenced 71, 72, 73 and 74 respectively. Generally speaking, in each of these regions one of the faces of the support 70 is parallel to the conductor pins C, while the other face is inclined at an angle of about 5° thereto. The portions 71 to 73 are of substantially regularly increasing thickness and define on one side of the comb, two recessed zones with surfaces parallel to the conductor pins on either side of a third zone that is inclined relative to the conductors; and on the other side of the comb, a central recessed zone whose surface is parallel to the pins situated between two inclined zones. The third portion 74 defines a fourth zone on each side of the comb (whether inclined or parallel to the conductor pins) which is analogous to the adjacent zone defined by the portion 73.

The portion 74 bears the contact terminals $C_b$, and further includes a longitudinal slot 76 in which the terminals $C_b$ are free to move. The edge of the member 70 forms a plastics comb 75 whose teeth are derived from the moulding operation when they extended in between the bars of the grid from which the conductor pins are cut before the second ends of the conductor pins C are folded into the shape of the contact terminals $C_b$ (see the bar shown dotted).

It will be observed, that the member 70 further includes longitudinally extending openings such as 77 which are interrupted and/or shifted relative to one another along the length of the member 70. These openings solve a problem to do with the behaviour of the grid during moulding. It will also be observed with reference to FIG. 4 that the conductor pins C are provided with lugs $C_p$ at their mid portions (obtained while the grid is being cut out) to provide a better grip in the member 70.

After referring to FIGS. 3 and 4, it can be seen from FIG. 1 (in which the individual parts of the combs are not given reference numeral for the sake clarity), that the inclined zone of the portion 73 of one comb constitutes the bearing surface for the next comb in the assembled stack counting from the wedging member 5 to the wedging member 6 (or for the wedging member 6 itself), while the zone of the same portion 73 which is parallel to the conductor pins constitutes the bearing zone for the preceding comb in the stack or the wedging member 5. The terminals $C_d$ come into contact with respective conductor pads (not shown) on the associated printed circuit card 8, with the inclined and slotted zone of the portion 74 constituting the bearing surface for the associated card 8 while still enabling the terminals $C_b$ to make contact with the printed circuits. The zone in said portion 74 which is parallel to the conductor pins bears against the opposite face of the card associated with the preceding comb or simply against the wedging member 5.

When the combs are being assembled, the inclined zones of the portions 71 and 72 of each comb engage in the parallel zones of the corresponding portions of the adjacent combs. Finally, it will be observed that the small bends in the conductor pins of some of the tiers in the assembled stack for bringing the tips into two lines instead of a single line, are imparted to said conductor pins during assembly of the print head. In contrast, the stylus forming tips are not chamfered until after the print head has been assembled.

Further details of the print head described with reference to FIGS. 1 and 2 can be seen in FIGS. 5 and 6 which are perspective views of the auxiliary conductor strip 3 (which is identical to the other strip 4) and one of the auxiliary conductors $C_{11}$. The way the strips 3 and 4 are assembled in the print head is also clarified in FIGS. 7 and 8 which show their uppermost portions on two different greatly enlarged scales.

The support member 30 of the strip 3 may be obtained by moulding, and its shape is adapted to its function of holding the row of auxiliary conductors $C_{11}$ which it bears. It is disposed on one side or other of the stack of combs 7 and serves to bring the first end $C_{11a}$ of its conductors (i.e. the counter-electrodes) into close proximity of the stylus forming tips in one or other of the lines of styluses.

The main body 32 of the member 30 has one of its faces turned towards the stack of combs. Said face is referred to as the first face, and it is crossed by a plurality of transverse ribs 35 which are interrupted near the middle by a longitudinally extending rod 31. The auxiliary conductors are individually lodged in between pairs of ribs 35, and they get past the rod 31 by being threaded through holes 36 which go through to the other, or second, surface of the main body round the back of the rod. The edges of the ribs 35 and the side of the rod 31 provide bearing surfaces for engaging the wedging member against which the strip is pressed (wedging member 5 in the case of the strip 3).

The longitudinally extending edge of the main body 32 opposite to the rim 33 is in the form of a plastics comb 38 whose teeth are extensions of the respective ribs on the first face. Their tips are bridged by a heel strip 39 leaving a longitudinally extending slot open towards said first face. The outside of the heel 39 comes into contact with the bearing surface 11 of the housing shell 1 when the print head is assembled (see FIG. 1), while the other bearing surface 12 of the housing shell 1 comes into contact with a longitudinally extending inclined zone 32A on the second face of the body 32, i.e. the face opposite to the said first face, not far from the rim 33.

The rim 33 is substantially in the form of a longitudinally extending rod projecting at an angle of about 110° from the main body 32 and stopping the ends of the ribs 35. Slots 37 connect the auxiliary conductor-receiving housings between the ribs 35 to the top surface of the rim 33 on which the the first ends $C_{11a}$ of the auxiliary conductors are flush. The auxiliary conductors $C_{11}$ are assembled on the support member 30 by being passed through said slots 37.

Figures 5, 6:
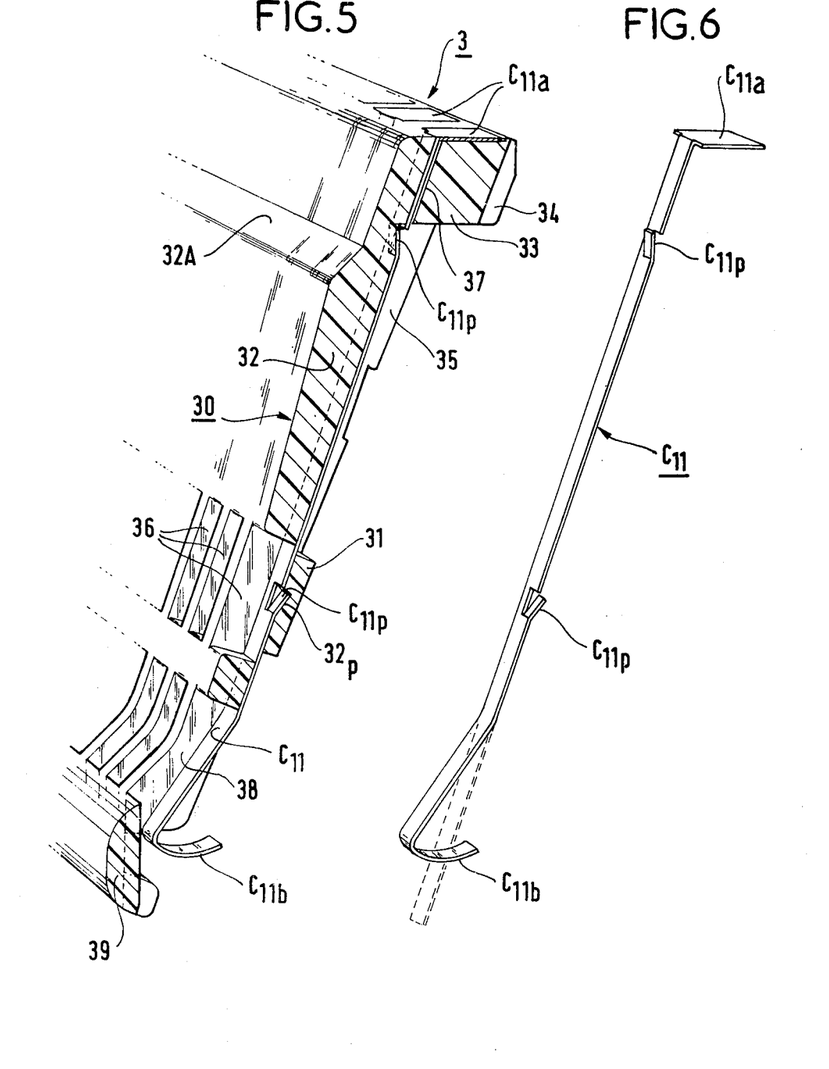
FIG. 5 is a partial perspective view and cross section of a strip of auxiliary conductors used in the print head.
FIG. 6 is a perspective view of an auxiliary conductor from the strip of FIG. 5.

As shown in FIGS. 5 and 6, the auxiliary conductors may be cut out from a flat sheet of metal. Each auxiliary conductor comprises a narrow metal blade extending away from the first end $C_{11a}$ which is wider than the rest of the auxiliary conductor and extends at 110° therefrom. Before being inserted in the support 30, the second end $C_{11b}$ of each auxiliary conductor is straight as shown in dotted lines in FIG. 6. The auxiliary conductor also has two lugs or tabs $C_{11p}$ disposed along its length and obtained by partially cutting out respective tongues from the narrow metal blade. These lugs are received in matching grooves e.g. $32_p$ in the main body 32 of the member 30. The lugs are arranged like barbs with a slope of about 30° to the blade so that they do not hinder insertion of the conductor into its housing in the support member 30, but once installed therein, the lugs prevent the conductor from being removed. Thus, each auxiliary conductor, while it is still generally rectilinear, is slid into its slot 37 and pushed home until its lugs lock it in place and its broad counter-electrode forming head engages the top surface of the rim 33. Once the tier of auxiliary conductors has been inserted in the support member 30, the second ends $C_{11b}$ are curved to form a corresponding number of hook shaped contact terminals which subsequently press down on the printed circuit card 9, jamming it against the lower edge of the slot in the heel 39 (see FIG. 1).

Further, as can be seen from FIG. 5 and FIGS. 7 and 8, the rim 33 of the member 30 has a row of teeth 34 along its front face which mesh with the corresponding row of teeth 44 along the front face of the rim 43 of the member 40. When meshed, the teeth leave small accurately defined spaces between the crowns of the individual teeth and the bottoms of the gaps between two adjacent teeth in the opposite row. Each of these spaces receives one of the styluses formed by the tips $C_{1a}$ to $C_{8a}$ of the conductor pins $C_1$ to $C_8$ respectively. Each stylus is thus held between the U-shaped gap between two adjacent teeth in one of the rows and the crown of the enmeshed tooth from the other row. Thus, FIG. 7 shows the tips $C_{2a}$ to $C_{4a}$ and $C_{6a}$ to $C_{7a}$ of conductor pins from different tiers held in place at the top of the print head by the two meshed rows of teeth. The stylus tips are thus held in the two lines corresponding to the groups $G_1$ and $G_2$ of tiers of conductor pins. Further, the tiers are advantageously disposed in such a manner that adjacent pairs of tips such as $C_3$ and $C_6$ or $C_4$ and $C_7$ are never taken from tiers having adjacent index numbers, thereby optimising electrical insulation between the conductor pins.

Further, it will be observed from FIG. 8 in which the two rows of teeth are shown at a distance apart before meshing for greater clarity, that the end counter-electrodes $C_{11a}$ and $C_{12a}$ extend for half the width of a counter-electrode beyond the ends of the rows of teeth, and hence, in the assembled print head, beyond the end stylus tips that are lodged between the teeth. Given that the counter-electrodes are disposed at a 3 mm pitch, and that the styluses are at a 125 $\mu$m pitch, the counter-electrodes (other that the end ones) are disposed adjacent to twelve teeth and twelve gaps between teeth, i.e. in operation there will be 24 styluses in front of each counter-electrode.

The two support members 30 and 40 thus ensure, by virtue of their meshing rows of teeth (see FIG. 7), that the two lines of counter-electrodes and the two lines of styluses are properly positioned relative to one another, with good electrical insulation between the styluses, between the styluses and the counter-electrodes, and between the counter-electrodes.

Some of the features of the print head 100 which have already been outlined above are now described in greater detail with reference to FIGS. 9 to 11.

Figure 9:
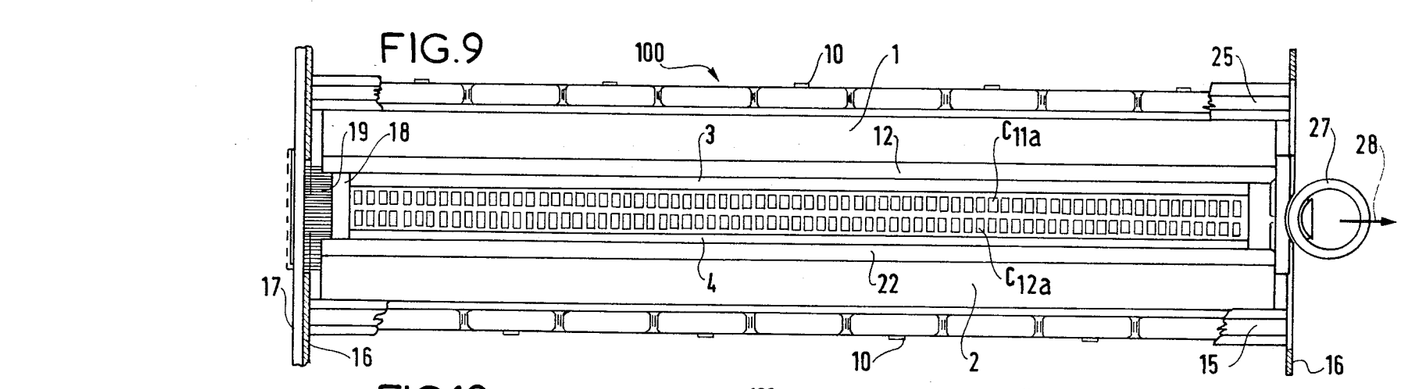
FIG. 9 is a plan view of the print head as a whole.
Figure 10:
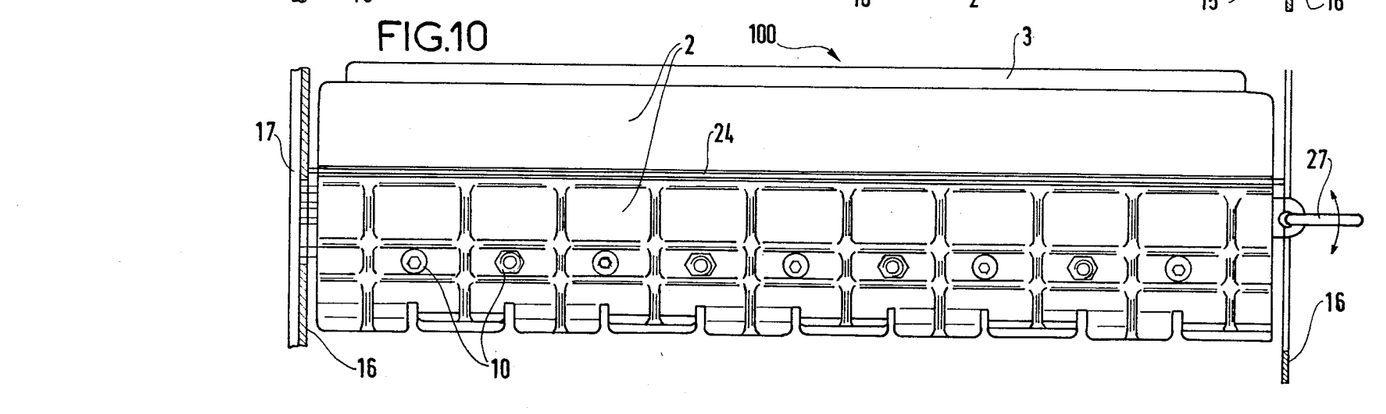
FIG. 10 is an elevation of the print head shown in FIG. 9.

In FIGS. 9 and 10, it can be seen that the print head 100 is associated with an additional printed circuit card 17 for head control. The card 17 is disposed on a frame member 16 of the facsimile apparatus which supports the abovementioned first end of the print head. The card 17 and the print head 100 are on opposite sides of the frame member 16. The control circuit on the card 17 is connected to the auxiliary electrode addressing circuit on the card 9 via a connector 18 on the card 9, and pins 19 projecting from the card 17. The pins 19 are connected to outputs of the control circuit on the card 17.

Although not shown in these Figures, it will be observed that connectors on the cards 8 are similarly connected to pins on the card 17.

The other end of the print head has a ring 27 which extends through the print head support member at that end thereof. The ring 27 is mechanically connected to the cards 8 and the card 9 to facilitate disconnecting the print head 100 from its control circuit card 17. In other words the ring provides a point from which a force can be applied to the cards 8 and 9 in the direction of an arrow 28 while the connection pins on the card 17 are pulled away from the other cards.

For the sake of clarity in the drawing, FIG. 9 does not show the two rows of teeth and the two lines of styluses that they hold in place between the counter-electrodes.

Finally, FIG. 11 shows the print head 100 seen end on from its first end and mounted between guide supports 15 and 25. This figure shows the relative disposition of the print head and the dielectric paper 50 on which it prints.

Firstly, it can be seen that each card 8 has six inputs a at said first end, while the card 9 has twenty-four inputs E (of which only 23 are actually used). These inputs are soldered to the edges of the respective cards.

Secondly, it can be seen that the dielectric paper 50 is pressed against the styluses and the counter-electrodes by a roller 51, while it is driven past the roller 51 and the print head 100 by a first drive roller 52 with a first idle roller 53 downstream from the print head and by a second drive roller 54 with a second idle roller 55 upstream therefrom. Naturally, other equipment such as a station for developing the latent image and another for fixing it are provided, but they are neither shown nor described in the present specification since they have no direct bearing on the invention. In practice such equipment would be placed on the paper path in between the print head and the drive roller 52 downstream therefrom.

Figure 12:
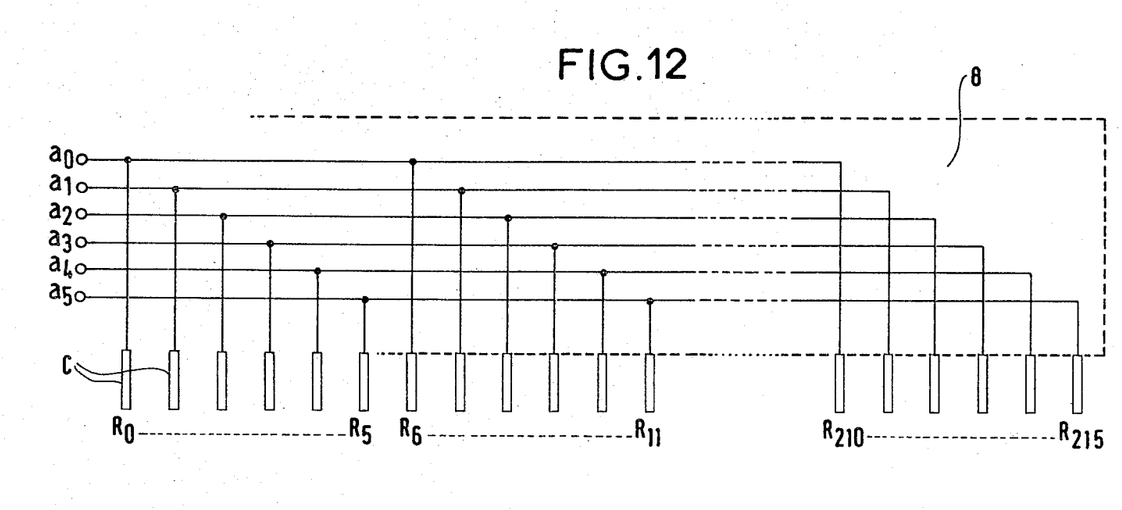
FIG. 12 is a circuit diagram of a printed circuit card used in the print head assembly.

FIG. 12 is a circuit diagram of the connection circuit on each of the cards 8 that are associated with respective combs 7 of conductor pins C ($C_1$ to $C_8$) which are also shown in the figure. The rank of a conductor pin along its tier (rank 0 to rank 215) is indicated by a reference $R_0, R_1, \ldots R_{215}$. The circuit connects each of the conductor pins to one of six inputs referenced individually as $a_0$ to $a_5$ located at the first end of the card 8.

Every 6th conductor pin is connected to the same input in a regular manner such that the rank of the pin modulo 6 (i.e. one of the integers 0 to 5) designates the subscript of the input to which that pin is connected. Thus, for the purposes of electricity supply, the pins along each tier are divided into six sets of thirty-six pins each.

For all eight cards 8 in the print head 100, the forty-eight (6×8=48) inputs a are referenced $a_{0,1}$ to $a_{5,1}$ for the conductor pins $C_1$, up to $a_{0,8}$ to $a_{5,8}$ for the conductor pins $C_8$. In other words the conductor pins are arranged in forty-eight sets of thirty-six pins each, and all thirty-six pins of each set are connected to a single input a corresponding to that set alone. Given the regular manner in which the thirty-six sets are organised in each tier, and the regular manner in which the conductor pins of the eight tiers are interdigitated, it follows that every forty-eighth stylus tip counting along both lines together is connected to the same input a.

Figure 13:
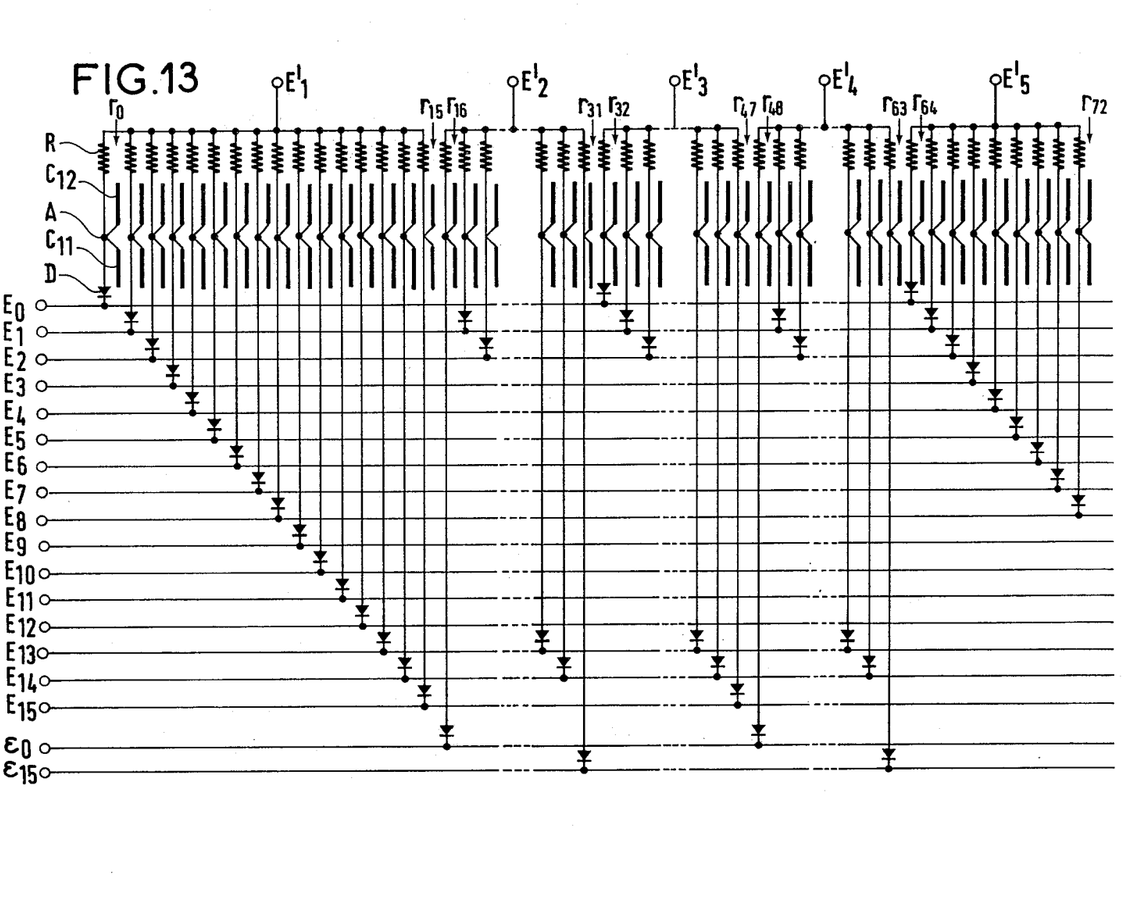
FIG. 13 is a circuit diagram of an addressing circuit mounted on a further printed circuit card.

FIG. 13 is the circuit diagram for the addressing circuit on the card 9 for addressing the the auxiliary conductors $C_{11}$ and $C_{12}$, i.e. the counter-electrodes. The auxiliary conductors $C_{11}$ and $C_{12}$ are labelled as such in the figure.

As will apear from the circuit diagram, the auxiliary conductors $C_{11}$ and $C_{12}$ are divided into four sets of thirty-two auxiliary conductors plus one set of eighteen auxiliary conductors. The auxiliary conductors of each set comprise equal numbers of auxiliary conductors from each row of auxiliary conductors, i.e. equal numbers of conductors $C_{11}$ and $C_{12}$, and these conductors are disposed side by side in two facing rows of sixteen, except for the set of eighteen which comprises the last nine auxiliary conductors in each row. Hereafter the term first set is used to designate the set whose conductors occupy ranks 0 to 15 in the two rows of auxiliary conductors, second set to designate ranks 16 to 31, and so on with the fifth set desgnating ranks 64 to 72. The first and last ranks of each set of auxiliary conductors are marked by the letter r followed by a numeral indicating the rank in question.

The auxiliary conductors $C_{11}$ and $C_{12}$ of the same rank are connected together to a point such as A which is thereafter considered to have the same rank as its auxiliary conductors. Each point A is connected to a resistor R and a diode D. There are thus sixteen points A in the first, second, third, and fourth sets, and nine in the fifth set. Each of the points A in the same set is connected via its associated resistor R to a set-designating input $E'_1$, $E'_2$, ..., $E'_5$ which is common to all the points A of the set in question. Further, the n-th point A in each set is connected via its associated diode D to one of rank-designating inputs $E_0$ to $E_{15}$ of the addressing circuit. There are two further rank-designating inputs $\epsilon_0$ and $\epsilon_{15}$. Generally speaking each point A is connected to the rank-designating input E whose subscript corresponds to the rank of the point A expressed modulo 16. The exceptions are the first and last points A of the even numbered sets which are connected instead to the that one of said further rank-designating inputs $\epsilon_0$ or $\epsilon_{15}$ whose subscript corresponds to the rank of the point A in question expressed modulo 16. In other words $r_{16}$ and $r_{48}$ are connected to input $_0$ instead of to input $E_0$ and $r_{31}$ and $r_{63}$ are connected to input 15 instead of to input $E_{15}$, for reasons that are explained below. The diodes D are disposed to conduct from the points A to the corresponding rank-designating input E or $\epsilon$.

The signals applied to the various inputs of the print head are generated by the command circuit referred to with reference to FIG. 9 and will be described in greater detail below during the description of print head operation.

In operation the paper is moved (e.g. stepwise) over the styluses and the counter-electrodes of the print head by the two drive rollers in the direction indicated by the arrows in FIG. 11. At the same time, the control circuit delivers input signals to the print head (the control circuit is not shown in FIG. 11 in order to leave the input connectors visible).

After each paper advance, image data signals are applied to the inputs a at a rate determined by a clock of period T. Image data representative of points of even parity along a first scan line are applied sequentially to the inputs $a_{0,1}$ to $a_{0,4}$, $a_{1,0}$ to $a_{1,4}$, etc. up to $a_{5,4}$. At the same time, image data representative of points of odd parity along a second scan line located two lines away from the first, are applied sequentially to the inputs $a_{0,5}$ to $a_{0,8}$, $a_{1,5}$ to $a_{1,8}$, etc. up to $a_{5,8}$. The same clock drives both sequential applications of data to the inputs a, and the total time for these operations between two paper advances is thus 864 periods T. Each data item may, for example, be expressed as a tension of 0 to 300 V depending on whether no charge or some charge is to be applied to the paper at the point in question. To apply charge to the paper, there must be a potential of at least 600 volts between a stylus and the counter-electrode opposite it, or in the case of a stylus opposite to the gap between two adjacent counter-electrodes, there must be a potential difference of at least 600 volts between the stylus and both of said counter-electrodes.

During the first period T (1st of 864 periods T), all the styluses of rank 0 (modulo 48) are thus put at a potential representative of the image point of rank 0 in said first scan line, while all the styluses of rank 1 (modulo 48) are put at a potential representative of the image point of rank 1 in said second scan line. All the other styluses are at 0 volts. During the second period T, all the styluses of rank 2 (modulo 48) are thus put at a potential representative of the image point of rank 2 in said first scan line, while all the styluses of rank 3 (modulo 48) are put at a potential representative of the image point of rank 3 in said second scan line. All the other styluses are at 0 volts, and so on up to the 48-th period T. A new cycle begins at the 49-th period T and the process is repeated up to the 864-th period T after which the paper is moved one step forward.

At the same time, a tension of 300 V is applied to each of the set determining inputs $E'_1$ to $E'_5$ in succession in such a manner that normally only one of the five set determining inputs is at 300 volts at any one time, with the others being at 0 volts. The larger sets are kept at 300 V for 180 (=15×12) periods T while the fifth set is kept at 300 V for 96 (=8×12) periods T. These time intervals are designated first through fifth normal time intervals respectively. In between successive normal time intervals, there is a transient time interval of 12 periods T duration during which two adjacent sets are both at 300 V, while the other three remain at 0 V. In particular there is a first transient time interval between the first and second normal time intervals, a second transient interval between the second and third normal intervals, and so on up to a fourth transient time interval between the fourth and fifth normal time intervals.

During each of the odd numbered normal time intervals (1st, 3rd and 5th) the said further rank-designating inputs $\epsilon_0$ and $\epsilon_{15}$ are held at a constant 0 volts while a tension of 300 V is applied successively to successive pairs of the sixteen rank-designating inputs $E_0$ to $E_{15}$, leaving the remaining fourteen inputs E at 0 V. This is done in such a manner that inputs $E_0$ and $E_1$ are at 300 V during the first twelve-periods T of the normal time interval under consideration, the inputs $E_1$ and $E_2$ are at 300 V during the next 12 periods T, and so on up to the last 12 periods T of the normal time interval, during which the inputs $E_{14}$ and $E_{15}$ are at 300 V (or $E_7$ and $E_8$ in the case of the fifth set which is shorter than the others).

During each of the even numbered normal time intervals the same process takes place, except that said further rank-designating inputs $\epsilon_0$ and $\epsilon_{15}$ are used instead of the correspondingly numbered inputs $E_0$ and $E_{15}$.

During the 1st and 3rd transient time intervals, 300 volts are applied simultaneously to the inputs $E_{15}$ and $\epsilon_0$, while the inputs $E_0$ to $E_{14}$ and $\epsilon_{15}$ are at 0 V. Likewise, during the 2nd and 4th transient time intervals, 300 volts are applied simultaneously to the inputs $\epsilon_{15}$ and $E_0$, while the inputs $E_1$ to $E_{15}$ and $\epsilon_0$ are at 0 V.

Depending on whether its diode D is conducting, each counter-electrode is either at 300 V, in which case the counter-electrode is addressed, or else it is at some much lower potential, or even at 0 V, in which case it is not addressed. A counter-electrode is at 300 V when its set-designating electrode and its rank-designating electrode are both at 300 V, i.e. when its diode is not conducting, and at substantially 0 V when its diode is conducting, or when its set-designating electrode is at 0 V (diode still not conducting). Thus, during the first 12 periods T, the counter-electrodes of ranks 0 and 1 in both rows of counter-electrodes are addressed, while all the even ranking styluses 0 to 22 (modulo 48) receive data representative of the first twelve even ranking points along said first scan line, and all the odd ranking styluses 1 to 23 (modulo 48) receive data representative of the first twelve odd ranking points along said second scan line. The first 24 points are thus pointed, since only the styluses adjacent the addressed auxiliary electrodes have any effect. During the second 12 periods T, counter-electrodes of ranks 1 and 2 are addressed, so the next 24 points of ranks 24 to 27 along the relevant scan lines are printed, even though all styluses of ranks 24 to 47 (modulo 48) receive data. This process continues with an addressed pair of counter-electrodes rippling along the print head and with only one of thirty-six possible styluses having any effect because of its proximity to the addressed counter-electrodes until the end of the lines of styluses are reached. All the even ranking points in said first when line are then printed, as are all the odd ranking points of said second scan line. The paper then moves forward by one scan line and the process is repeated.

It can now be seen that the said further rank-designating inputs $\epsilon_0$ and $\epsilon_{15}$ serve to ensure that there are never more than two counter-electrodes being addressed at the same time.

The head control circuit is not described in structural detail since it is part of the competence of a person skilled in the art to design such circuits given a functional description of its output signals such as that given above.

A particular embodiment of the invention has been described, but it is clear that it could be modified in various ways without going beyond the scope of the invention. In particular, the plurality of tiers of conductor pins that form a single group with a single line of stylus tips could have a single mechanical support common to all the tiers, instead of the tiers making up the group having individual supports that are stacked together. There could be more than two groups of tiers of conductor pins (and corresponding lines of stylus tips).

Further, it should be clear that the invention is not limited to printing by the electrostatic process described. Nor is the particular arrangement of counter-electrodes described necessary for an electrostatic printing process: the counter-electrodes could be disposed on the other side of the paper, for example. A print head in accordance with the invention could be used for electrochemical or electrothermal printing. This would require the counter-electrodes to be earthed or dispensed with, leading to more complicated stylus addressing, since there would not be any counter electrodes to address in a stylus-selecting manner, but suitable serial to parallel conversion circuits could be mounted on the stylus selecting circuit cards themselves, and there would be the advantage that much lower voltages would be used (e.g. less than about 30 V). If heat sensitive paper were used, auxiliary conductors would be pointless, and a return path from a tip-mounted heating element would have to be provided. This could be done by means of further tiers of conductor pins, preferably mounted in the same stack as those already described, with respective heating elements connected between corresponding pairs of tips. Further connection circuits would be required, but they could be combined on a single card for each pair of interconnected tiers.

I claim:

1. A print head comprising a plurality of styluses which are regularly spaced out along at least two parallel lines, with the styluses being off-set relative to one another from one line to the next, said styluses being formed by the tips of respective electrical conductor pins which are rectilinear at least over a portion of their length which is near to said stylus-forming tips, the improvement comprising means for mounting said pins in a plurality of tiers with the tips of the pins in each tier being aligned and regularly spaced, and at least said rectilinear portions of the pins lying parallel to one another, and wherein each line comprises interdigitated stylus tips from a group of n tiers of pins, where n is an integer greater than 1, with every n-th tip in the line belonging to the same tier, and with the parallel portions of said tiers occupying respective planes that fan out from said line, and means for stacking the different groups of tiers of pins whose tips constitute the different lines of styluses into a single assembly.

2. A print head according to claim 1, wherein the electrical conductor pins of each tier are embedded in a flat elongate tier support member of insulating material having two longitudinal edges forming a comb, with the stylus-forming tips of the pins projecting from one of the longitudinal edges of the support member, and with the opposite ends of the pins projecting from the other longitudinal edge of the support member and extending back over the support member to constitute connection terminals.

3. A print head according to claim 2, wherein the tier support members have complementary longitudinally extending faces, whereby two adjacently stacked combs in the same line-forming group of tiers of conductor pins engage each other in such a manner that the tips of their respective conductor pins occupy a single line, with the combs fanning out therefrom.

4. A print head according to claim 2 or 3, wherein each comb is associated with a longitudinally extending printed circuit card having a pin connection circuit thereon comprising connection pads to make electrical connection with respective ones of the connection terminals of the comb, and conductor tracks connecting each of said pads to an electrical input located at an end of the circuit card.

5. A print head according to claim 3, wherein each group of tiers of conductor pins is associated with an auxiliary tier of conductors having tips that are aligned in a line located close to the group's line of stylus-forming tips, said auxiliary conductor tips constituting a line of counter-electrodes.

6. A print head according to claim 5, further comprising support members of insulating material holding the tiers of auxiliary conductors in place mechanically which, together with the auxiliary conductors that they support, constitute auxiliary conductor strips.

7. A print head according to claim 6, wherein each of said auxiliary conductor support members is provided with a longitudinally extending row of teeth for engaging the stylus-forming tips associated therewith and said teeth interengage to suitably locate the stylus tips relative to the counter-electrodes, and to insulate them therefrom.

8. A print head according to claim 5, further including an elongate printed circuit card having an addressing circuit for addressing the auxiliary conductors, said printed circuit card further including conductor pads making contact with the auxiliary conductors at their ends opposite to said counter-electrode forming tips, and conductor tracks connecting said pads, via said addressing circuit, to print head addressing inputs located at an end of the printed circuit card.

9. A print head according to claim 1, wherein said conductor pins are arranged in two groups of four tiers each.

10. A print head according to claim 1, comprising:
- a flat elongate tier support member of insulating material for each tier of conductor pins, said support member having a first longitudinal edge from which the stylus-forming tips of the pins project and a second, opposite longitudinal edge from which the opposite ends of the conductor pins project and extend back over the support member to constitute connection terminals, a tier of conductor pins and their support member comprising a comb, the support member tapering in thickness from said second edge to said first edge, and having complementary longitudinally extending faces including alternating longitudinally extending projections and recesses occupying at least a part of the width of the faces to enable two combs to interfit when stacked together, the support member further including two longitudinally extending marginal zones running along said second edge, said zones being stepped relative to each other to leave a longitudinal groove in which said terminals are free to move;
- stack wedging members running longitudinally along the outer faces of the stack of combs, and having stack facing surfaces that are complementary to the corresponding outer faces of the stack of combs; and
- a plurality of longitudinally extending printed circuit cards corresponding to respective ones of the combs to supply electricity to the conductor pins thereof, each printed circuit card being inserted in between said two marginal zones of the corresponding support member and adjacent support member or adjacent stack wedging member, the connection circuit on each of the printed circuit cards comprising connection pads making electrical connection with respective ones of the connection terminals of the corresponding comb, and conductor tracks connecting each of said pads to an electrical input located at an end of the circuit card, and hence of the print head.

11. A print head according to claim 10, having two lines of styluses with said conductor pins arranged in two groups of four tiers each, and wherein the print head further comprises:
- two tiers of auxiliary conductors having tips forming counter-electrodes that are alingred in two respective lines which are located close to and are associated with respective ones of the lines the two groups of stylus-forming tips;
- a support member of insulating material for each of said tiers of auxiliary conductors, the assembled tiers of auxiliary conductors on their respective support members constituting auxiliary conductor strips which interfit with the outside faces of respective ones of said stack wedging members, each of said auxiliary conductor strips having a rim on a first longitudinal edge located at the front of the print head, said rim having an outside surface in which the tips of the auxiliary conductors are flush and an edge which is provided with a longitudinally extending row of teeth for engaging the stylus-forming tips of the associated group of tiers of conductor pins, each of said auxiliary conductor strips having a longitudinally extending groove facing the stack of combs and located near to a second edge of the strip opposite to said first edge, the ends of the auxiliary conductors opposite to their counter-electrode forming tips being hook-shaped and projecting into said groove; and
- an elongate printed circuit card having an addressing circuit for addressing the auxiliary conductors of both strips of auxiliary conductors, said card having two longitudinal edges received in said grooves in the auxiliary conductor strips, and having conductor pads making contact in said grooves with said hook-shaped ends of the auxiliary conductors, said addressing circuit having outputs connected to said conductor pads located along the edges of the card, and inputs available at an end of said card.

* * * * *